INVENTOR.
R. G. PIETY
BY Hudson & Young
ATTORNEYS

Dec. 12, 1961 — R. G. PIETY — 3,012,625
METHOD OF SEISMIC EXPLORATION
Filed July 12, 1956 — 2 Sheets-Sheet 2

INVENTOR.
R.G. PIETY
BY Hudson & Young
ATTORNEYS

United States Patent Office 3,012,625
Patented Dec. 12, 1961

3,012,625
METHOD OF SEISMIC EXPLORATION
Raymond G. Piety, Bartlesville, Okla., assignor to Phillips Petroleum Company, a corporation of Delaware
Filed July 12, 1956, Ser. No. 597,523
6 Claims. (Cl. 181—.5)

This invention relates to seismic exploration.

Seismic exploration involves obtaining information regarding subterranean earth formations by transmitting vibrations from a first point at or near the surface of the earth downwardly into the earth and measuring the reflected or refracted vibrations at one or more points spaced from the first point. It is common practice to detonate an explosive charge to produce the vibrations. A plurality of vibration responsive seismometers are disposed in a predetermined geometric array in spaced relationship with the shot hole. The earth vibrations incident upon the seismometers are converted into corresponding electrical signals. These signals are amplified and recorded. By measuring the travel times of selected vibrations, information can be obtained regarding the depth and slope of subterranean reflecting formations. However, extraneous earth vibrations and second order reflections normally are received in addition to the desired reflections. These extraneous vibrations tend to complicate the record and make it more difficult to recognize the desired reflections.

The present invention provides an improved method of seismic exploration wherein extraneous vibrations are canceled or greatly diminished. The method of this invention involves establishing vibrations at two or more points in a shot hole at different depths. The two vibrations are established in sequence and recorded separately. The recorded vibrations are then combined after incorporating a proper delay in one of the records to cancel second order reflections. The two shot points are spaced from one another vertically so that it is possible to cancel second order reflections from the combined records and permit the first order reflections to be added in amplitude.

Accordingly, it is an object of this invention to provide an improved method of measuring the travel times of reflected seismic vibrations.

Another object is to provide a method of recording and reproducing seismic signals in such a manner as to amplify the desired reflections and minimize random noise vibrations.

Other objects, advantages and features of the invention should become apparent from the following detailed description which is taken in conjunction with the accompanying drawing in which.

Figure 1:
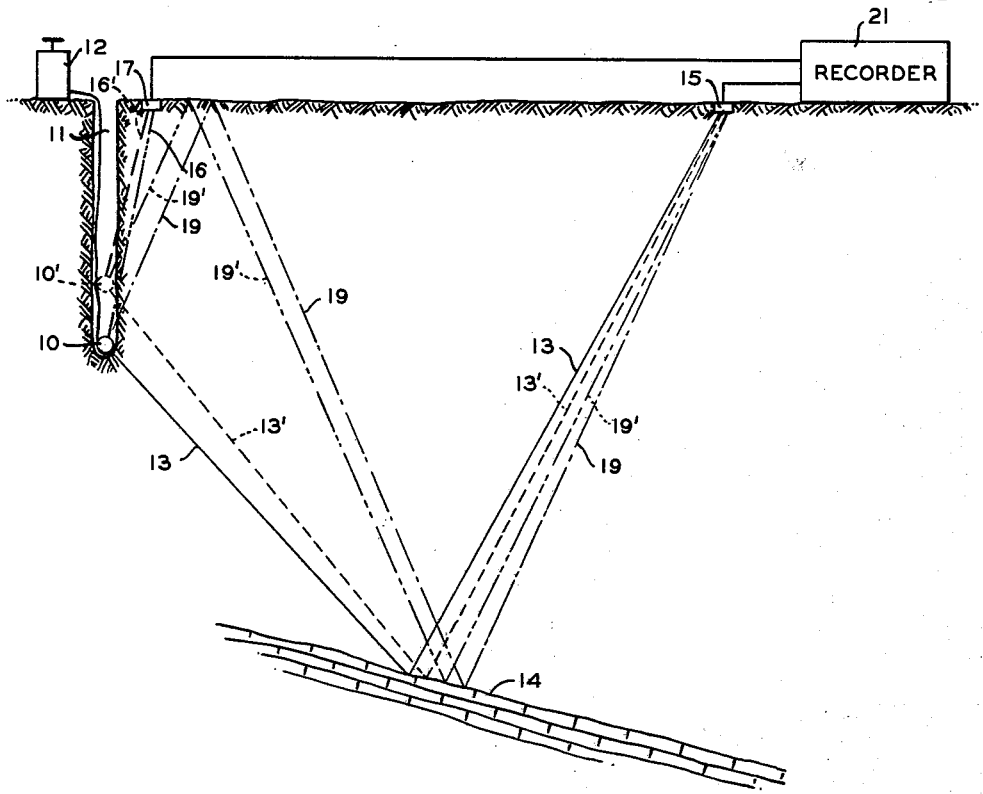
FIGURE 1 is a sectional view of the earth showing a seismic exploration system which employs the principles of this invention.

Referring now to the drawing in detail and to FIGURE 1 in particular, there is shown a schematic representation of apparatus employed to carry out the method of the invention. Vibrations are established at a first point in the earth by detonating an explosive charge 10 in a shot hole 11. This is accomplished by a detonator 12. Vibrations emitted from charge 10 follow a first downwardly path 13 and are reflected by a bed 14 to a first seismometer 15 that is shown near the surface of the earth. Vibrations from charge 10 follow a second path 16 directly to a second seismometer 17 which is positioned near the top of the shot hole. Vibrations from charge 10 also follow a third path 19 upwardly to the surface of the earth. These vibrations are reflected from the surface downwardly to bed 14 and are again reflected upwardly to seismometer 15. These vibrations are referred to herein as second order vibrations. A second explosive charge 10' is subsequently detonated in shot hole 11 at a second point spaced above point 10. Vibrations from explosive charge 10' follow paths 13', 16' and 19' which correspond generally to the paths previously described. The horizontal spacing between shot hole 11 and seismometer 15 normally is smaller, with respect to the depth of bed 14, then illustrated. The drawing illustrates the general wave paths, however.

Figure 3:
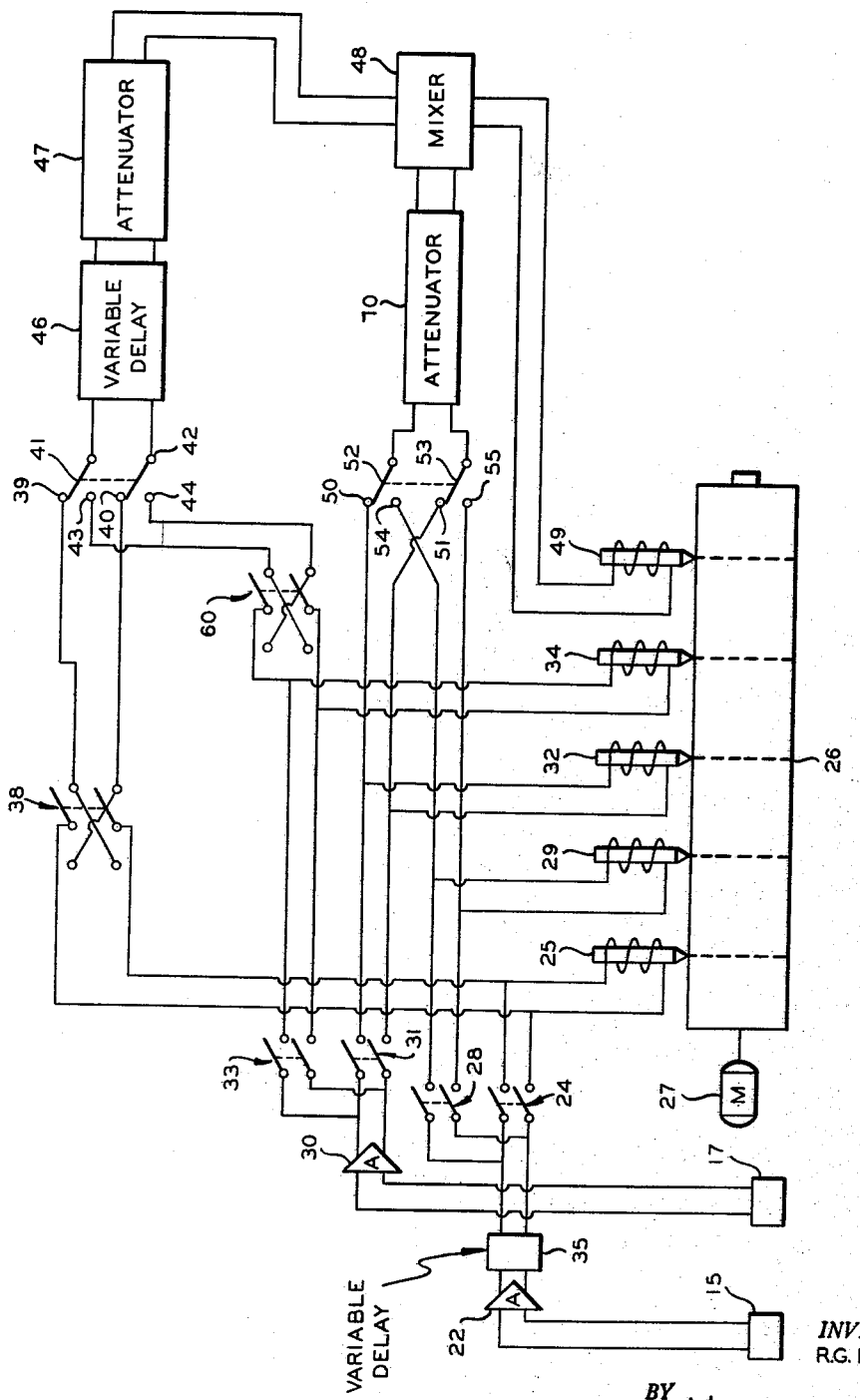
FIGURE 3 is a schematic circuit diagram of recording and reproducing apparatus which can be utilized to carry out the method of the invention.

The output signals from seismometers 17 and 15 are applied to recording apparatus 21, which can be of the form illustrated in FIGURE 3. The output terminals of seismometer 15 are connected to the input terminals of an amplifier 22. The output terminals of amplifier 22 are connected through a variable delay network 35 and through a switch 24 to a first recording head 25 of a magnetic recorder. This recorder further comprises a drum 26 which is rotated by a motor 27. The output terminals of network 35 are also connected through a switch 28 to a second recording head 29. The output terminals of seismometer 17 are connected to the input terminals of a second amplifier 30. The output terminals of amplifier 30 are connected through a switch 31 to a third recording head 32. The output terminals of amplifier 30 are also connected through a switch 33 to a fourth recording head 34.

Recording head 25 is connected through a reversing switch 38 to terminals 39 and 40 of respective switches 41 and 42. Recording head 34 is connected through reversing switch 60 to second terminals 43 and 44 of respective switches 41 and 42. Switches 41 and 42 are connected to the input terminals of a variable delay network 46. Networks 35 and 46 can be of the form described in the copending application of J. P. Lindsey, Serial No. 563,531, filed February 6, 1956, now Patent No. 2,940,- 062, for example. The output terminals of network 46 are connected through an attenuator 47 to the first input of a mixer circuit 48. Recording head 32 is connected to terminals 50 and 51 of respective switches 52 and 53. Switches 52 and 53 are connected through an attenuator 70 to the second input of mixer 48. The output of mixer 48 is applied to a fifth recorder head 49 of drum 26. If desired, the output of mixer 48 can be applied to other types of recorders, such as a conventional photographic recorder, for example.

Figure 2:
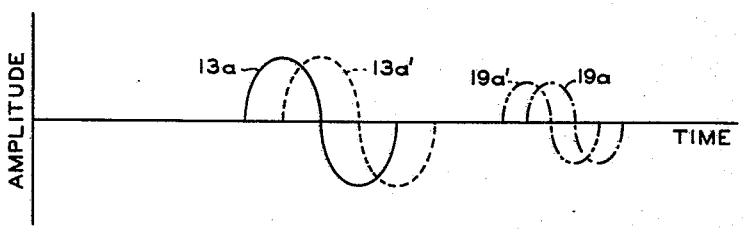
FIGURE 2 is a schematic time graph showing vibrations of the type received by the recorder of FIGURE 1 when the illustrated explosive charges are detonated.

In order to describe the operation of a first embodiment of this invention, it will arbitrarily be assumed that explosive charges 10 and 10' are positioned in a region of the earth which transmits vibrations at an average known velocity of 10,000 feet per second. It will also be assumed that the dominant frequency of the vibrations to be measured is of the order of 50 cycles per second. This can represent the average frequency of the vibrations. Such vibrations have a wave length of 200 feet and a period of 20 milliseconds. Under ideal conditions, explosive charges 10 and 10' are separated from one another a distance of 50 feet, which represents one-fourth of a wave length. If the charges were so separated and the vibrations received by the seismometer 15 were separately recorded without any delay, the record would be somewhat as shown in FIGURE 2. The abscissa of FIGURE 2 represents time and the ordinate represents the amplitude of vibrations applied to recorder 21 from seismometer 15. FIGURE 2 represents schematically an ideal situation having no extraneous vibrations. The vibrations represented as traveling by paths 13, 13', 19 and 19' of FIGURE 1 are designated by curves 13a, 13a', 19a and 19a' in FIGURE 2. It will be appreciated that the vibrations received from the two explosive charges 10 and 10′ normally are recorded separately. They are shown together in FIGURE 2 in order to describe the operation of the procedure of this invention. Curves 13a and 13a′ are separated from one another by approximately 90° because the downward vibrations from shot point 10′ must travel a distance equal to one-fourth of a wave length between shot points 10′ and 10. It is assumed that the vertical distances are large with respect to horizontal distances so that differences in travel paths are approximately equal to the difference in vertical spacing between shot points. Curve 19a′ leads curve 19a by approximately 90° because vibrations represented by path 19′ travel less distance then the vibrations represented by path 19.

In carrying out one embodiment of the method of the invention, switch 24 is closed when explosive charge 10 is detonated so that the vibrations received at seisomometer 15 are applied to recording head 25. Switch 28 is closed and switch 24 is opened when explosive charge 10′ is detonated so that the vibrations received at seismometer 15 are applied to recording head 29. Network 35 is initially set so that the first signal is applied to recording head 25 without any delay. Network 35 is then adjusted so that the signal applied to recording head 29 is delayed by 5 milliseconds. Switches 52 and 53 are then moved to the "down" positions and switches 41 and 42 are moved to the "up" positions. Switches 24 and 28 are opened. Drum 26 is rotated past heads 25 and 29 which also operate as reproducing heads. The two signals previously recorded are combined by mixer 48 and the sum is applied to recording head 49. The additional delay of 5 milliseconds incorporated in the second signal by network 35 results in curve 19a′ being moved to the right in FIGURE 2 by 90°. Network 46 is set for zero delay. Curve 13a′ is similarly moved. Switch 38 reverses the phase of the reproduced signal from head 25 so that curves 19a and 19a′ are recorded 180° out of phase with one another and tend to cancel one another in the composite record. Curves 13a and 13a′ are, however, in phase so that the amplitudes are added on the composite record. This results in a record being produced which amplifies the desired first order reflections and cancels the extraneous second order reflections. Other extraneous vibrations, such as ground roll, tend to be canceled from the composite record because these vibrations occur at random times and normally cancel one another when two or more records are combined.

In some instances, it may be found that the two recorded signals differ in amplitude because the shot points are located in formations having different transmission properties. Seismometer 17 is employed to provide a direct measurement of the vibrations emitted from the two explosive charges. The two signals received by seismometer 17 are recorded by respective heads 32 and 34. These records can be compared to determine if the vibrations from one of the explosive charges are greater than those of the other. If such a situation is found to occur, attenuators 47 and 70 can be set to reduce the amplitude of one of the signals to correspond to that of the other. Obviously, this attenuation can result from either a reduction in amplitude of one of the signals or an amplification of the other.

The system previously described has been based on the assumption that the two shot points can be spaced from one another by a distance representative of one-fourth of a wave length. In some shot holes, this is not possible because such a spacing might result in one of the shot points being located in an undesirable formation. The method of this invention can still be carried out and improved results obtained. For example, explosive charges 10 and 10′ can be separated from one another by a distance of only 40 feet. This results in the travel times of the two signals differing from one another by only four milliseconds. This results in curves 13a and 13a′ being displaced from one another by 72°. By incorporating a delay of 4 milliseconds in the record produced from shot point 10′, curves 19a and 19a′ are again displaced from one another by 180°. However, curve 13a′ is displaced some 36° from curve 13a. The desired reflections are thus not entirely in phase with one another, but an improved record is obtained. As an alternative, the signals can be delayed by an amount sufficient to place the desired reflections in phase with one another. This in turn results in the second order reflections not canceling completely. Furthermore, a compromise can be made to provide maximum addition of the first order reflections with maximum cancellation of the second order reflections.

The delay which is incorporated in one of the signals can be obtained by three different procedures. The first involves the use of delay network 35 in the manner previously described. The second involves displacing recording head 29 from recording head 25 at the time the signals are initially recorded. The third method involves displacing heads 25 and 29 relative to one another at the time the signals are reproduced.

In some operations, it is desired to fire three or more spaced explosive charges in a given shot hole. This permits several sets of records to be combined in order to find two records that produce the desired cancellation effects. As a practical matter, it is necessary to detonate the lowermost explosive charge first. Otherwise, the shot hole may be destroyed by the first explosion.

In many regions, the velocities of seismic wave propagation are somewhat variable. The correction procedure then may vary from that previously described. The difference in travel times of the two waves from charges 10 and 10′ can be obtained by playing back the records from heads 32 and 34. In this case, head 32 records vibrations from charge 10 and head 34 records vibrations from charge 10′. Delay network 46 is adjusted so that the reproduced records from heads 32 and 34 show coincident arrival times of the vibrations. The phase of head 34 is reversed by switch 60. One or both of the attenuators is adjusted to give the best possible cancellation of the initial portion of the uphole wavelet. This establishes the correct delay and attenuation for subsequent reproduction of the records at heads 25 and 29.

Delay network 35 is set at zero when records from seismometer 15 are recorded by heads 25 and 29. These records are then combined to give a composite record. The phase of one record is reversed from that of the other by switch 38 and the delay previously established is employed. When seismometers 17 and 15 are separated by a large distance so that the downward traveling wave is at a large angle, the balance conditions will be changed. Seismometer 17 should be placed a distance out from the shot hole so that the portion of the wavefront which it records corresponds with the portion of the expanded wave front which later appears at seismometer 15. When this procedure is followed and the result evaluated for the situation shown in FIGURE 2, it will turn out that trace 19a′ is reversed and opposes 19a. Trace 13a′ will be still further delayed and when it is reversed the forward half cycle of 13a will be in phase with the trailing half cycle of 13a′. It is not essential that the two shots be separated by as large a distance as illustrated by this figure. Half the value would only reduce the center wave by about 40 percent from the value obtained.

From the foregoing discussion, it should be evident that there is provided in accordance with this invention an improved method of seismic prospecting which involves detonating two or more explosive charges in sequence at different depths in a shot hole. By proper spacing of the explosive charges and proper delay of at least one of the recorded vibrations, it is possible to provide a composite record wherein the desired first order reflections are exemplified and extraneous second order reflections are minimized. While the invention has been described in conjunction with present preferred embodiments, it should be evident that it is not limited thereto.

What is claimed is:
1. The method of seismic prospecting which comprises detonating a first explosive charge in a shot hole at a first point, recording vibrations received at a first location spaced from said first point to form a first signal, detonating a second explosive charge in the shot hole at a second point spaced vertically from said first point, said second point being spaced above said first point a distance substantially

$$\frac{v}{4f}$$

where $v$ is the velocity at which vibrations are transmitted in the earth in the region of said points, and $f$ is the dominant frequency of the seismic vibrations to be measured, recording vibrations received at said first location resulting from said second charge to form a second signal, and combining the two recorded signals with a phase reversal of one after delaying the second-mentioned recorded signal relative to the first-mentioned recorded signal a time substantially $$\frac{T}{4}$$

where T is the period of said seismic vibrations to be measured.

2. The method of claim 1 wherein $f$ is 50 cycles per second.

3. The method of claim 1 further comprising measuring vibrations received near the surface of the earth adjacent the shot hole directly from each of said charges to provide information regarding the relative amplitudes of vibrations emitted from the two explosive charges and adjusting the amplitude of at least one of the recorded signals so that vibrations corresponding to the measured vibrations are of approximately equal amplitude in the recorded signals prior to being combined.

4. The method of seismic prospecting which comprises detonating a first explosive charge in a shot hole at a first point, recording vibrations received at second and third spaced points near the surface of the earth, said second point being nearer the shot hole than said third point, detonating a second explosive charge in the shot hole at a fourth point which is spaced vertically from said first point, recording vibrations received at said second and third points, and combining the two recordings of vibrations received at said third point with the phase of one reversed and a delay incorporated in the record from the upper explosive charge equal to the differences of travel times of vibrations from said first and fourth points to said second point.

5. The method of claim 4 further comprising adjusting the amplitude of at least one of the combined recordings so that second order relections in the combined record cancel one another.

6. The method of seismic prospecting which comprises detonating a first explosive charge in a shot hole at a first point, recording vibrations resulting from said first charge which are received at the surface of the earth at a first location spaced from said first point to form a first recorded signal, thereafter detonating a second explosive charge in the shot hole at a second point spaced vertically from said first point, recording vibrations resulting from said second charge which are received at said first location to form a second recorded signal, said second point being spaced above said first point so that vibrations which initially travel downwardly and are reflected from a subterranean formation below said first point and received at said first location from said first and second explosive charges are $x$ degrees out of phase with one another in said first and second recorded signals, taken with respect to common initial times when the respective explosive chrages are detonated, displacing the second recorded signal relative to the first recorded signal so that common reflections from said subterranean formation are delayed by $x$ degrees in the second recorded signal, taken with respect to said common initial times, and subtracting one of said recorded signals from the other.

References Cited in the file of this patent
UNITED STATES PATENTS

| | | |
|---|---|---|
| 1,724,720 | McCollum | Aug. 13, 1929 |
| 1,959,004 | Owen | May 15, 1934 |
| 2,059,018 | North | Oct. 27, 1936 |
| 2,243,730 | Ellis | May 27, 1941 |
| 2,449,037 | Harkness | Sept. 7, 1948 |
| 2,732,906 | Mayne | Jan. 31, 1956 |
| 2,767,389 | McCollum | Oct. 16, 1956 |
| 2,795,287 | Sharpe | June 11, 1957 |
| 2,806,545 | Schempf | Sept. 17, 1957 |
| 2,808,894 | Eisler et al. | Oct. 8, 1957 |
| 2,882,988 | Dobrin | Apr. 21, 1959 |

OTHER REFERENCES

Handley: "How Magnetic Recording Aids Seismic Operations," Oil and Gas Journal, vol. 52, No. 36, Jan. 11, 1954, pages 158 and 159.